United States Patent [19]
Ohta et al.

[11] Patent Number: 5,634,695
[45] Date of Patent: Jun. 3, 1997

[54] HYDRAULIC APPARATUS AND ANTI-LOCK BRAKE CONTROL APPARATUS FOR A VEHICLE

[75] Inventors: Kazuhiro Ohta; Naotoshi Tamai; Atsushi Shimizu; Takashi Aoki, all of Nagano, Japan

[73] Assignee: Nissin Kogyo Co., Ltd., Nagano, Japan

[21] Appl. No.: 408,704

[22] Filed: Mar. 22, 1995

[30] Foreign Application Priority Data

Mar. 30, 1994 [JP] Japan .................................. 6-060943
Apr. 27, 1994 [JP] Japan .................................. 6-089693

[51] Int. Cl.$^6$ .............................. B60T 13/10; B60T 17/04
[52] U.S. Cl. .............................. 303/10; 303/116.4; 303/87
[58] Field of Search .............................. 303/116.1, 116.2, 303/116.4, 119.2, 10, 87

[56] References Cited

U.S. PATENT DOCUMENTS

| | | | |
|---|---|---|---|
| 4,953,918 | 9/1990 | Hashida et al. | 303/116.4 X |
| 5,022,717 | 6/1991 | Heibel et al. | 303/116.4 X |
| 5,127,712 | 7/1992 | Rizk et al. | 303/116.4 X |
| 5,236,253 | 8/1993 | Glasmacher | 303/116.4 X |
| 5,335,983 | 8/1994 | Beck et al. | 303/119.2 |
| 5,458,160 | 10/1995 | Tamaoki et al. | 303/119.2 X |
| 5,460,438 | 10/1995 | Hellmann et al. | 303/87 X |
| 5,567,022 | 10/1996 | Linkner, Jr. | 303/87 |

FOREIGN PATENT DOCUMENTS 313268 2/1992 Japan .

*Primary Examiner*—Lee W. Young
*Attorney, Agent, or Firm*—Whitham, Curtis, Whitham & McGinn

[57] ABSTRACT

In a hydraulic apparatus providing a base with a discharge passage coupler to a circumferential portion of an annular discharge passage and to a damper chamber, a hydraulic device is connected via an orifice to the discharge passage without arranging the annular discharge passage between the damper chamber and the orifices, so that the damper chamber and the orifices cooperate together to exert an effective attenuating action thereon so as to suppress the transfer of pressure pulsation thereto effectively. Further, in an anti-lock brake control apparatus providing a pipe member which integrally includes an orifice interposed between a damper and a normally open electromagnetic valve, a sheet pipe corrected to an inner end of a connecting hole coaxially with the orifice, and a coupling pipe portion coaxially formed between the orifice and the sheet pipe, the sheet pipe is fitted into a large-diameter portion of the base and the orifice is fitted into a small-diameter portion of the base, thus the number of component parts is reduced and the normally open electromagnetic valves are prevented from malfunctioning due to the clogging of the orifices by dust.

18 Claims, 10 Drawing Sheets

HYDRAULIC APPARATUS AND ANTI-LOCK BRAKE CONTROL APPARATUS FOR A VEHICLE

BACKGROUND OF THE INVENTION

The present invention relates to a hydraulic apparatus providing a base, pumps fitted into and secured to the base, the pumps each having annular discharge passages formed between the pumps and the base, damper chambers each connected to the discharge passages, and a hydraulic equipment connected via orifices to the discharge passages.

Further, the present invention relates to an anti-lock brake control apparatus for a vehicle, in which the apparatus has a base arranging normally open electromagnetic valves for connecting and breaking the communication between a master cylinder and wheel brakes, normally closed electromagnetic valves for connecting and breaking the communication between reservoirs and the wheel brakes, return pumps with suction vents connected to the respective reservoirs, dampers each connected to discharge vents of the return pumps, and orifices each interposed between the return pumps or the dampers and the normally open electromagnetic valves. The base further arranges connecting holes serving as threaded holes each coaxial with the orifices, a sheet pipe secured so that it is located at the inner ends of the connecting holes, conduits connected to the master cylinder, the conduit having a flare portion adhering to the sheet pipe at an end of the conduit, and a screw member fitted to the outer periphery of the conduit and screwed into the connecting hole by pressing the flare portion against the sheet pipe.

Conventionally, a hydraulic apparatus and an anti-lock brake control apparatus of such a type as introduced above have been proposed in Unexamined Japanese Utility Model Publication No. Hei. 3-13268.

With the conventional hydraulic apparatus, the damper chamber communicates with the first discharge vent formed on the downstream side of the annular discharge passage, and the orifice communicates with the second discharge vent formed on the upstream side thereof so as to prevent air from accumulating in the annular discharge passage. Despite the provision of the damper chamber and the orifice to prevent the discharge pulsation from the pump from affecting the hydraulic equipment in trouble, the damper chamber and the orifice exhibit an inherent damping action of themselves but they are hardly capable of effectively exhibiting a damping action as a whole of the hydraulic apparatus because the annular discharge passage has great flow resistance and is interposed between the damper chamber and the orifice.

With the conventional anti-lock brake control apparatus, moreover, the sheet pipe and the orifices employed as separate members have been forced into and secured with a clearance provided therebetween in the axial direction. For this reason, the number of component parts tends to increase, and the dust produced at the time when the sheet pipe is forced into the base not only cause the orifices to be clogged but also cause the normally open electromagnetic valves to malfunction when the dust flow into the valve. If, moreover, the orifices are forced into and fixed thereto unsatisfactorily, the orifices slip out because of the discharge pressure in the return pumps.

SUMMARY OF THE INVENTION

An object of the present invention made in view of the conventional problems is to provide a hydraulic apparatus so designed as to exhibit a damping action effectively in cooperation with damper chambers and orifices.

Another object of the present invention is to provide an anti-lock brake control apparatus for a vehicle in which the apparatus is capable of decreasing the number of component parts, preventing not only orifices from being clogged with the dust produced but also normally open electromagnetic valves from malfunctioning thereby to ensure that the orifices can be secured.

In the first aspect of the present invention, the object above can be accomplished by a hydraulic apparatus providing a base, pumps fitted into and secured to the base, the pumps each having annular discharge passages relative to the base, damper chambers each connected to the annular discharge passages, and hydraulic equipment connected via orifices to the discharge passages, in which the base is provided with a discharge passage coupled to a circumferential portion of the annular discharge passage and communicates with the damper chamber and wherein the hydraulic equipment is connected via the orifices to the discharge passage.

In the second aspect of the present invention, in addition to the arrangement made in the first aspect thereof, the discharge passages are connected via the orifices to a master cylinder as the hydraulic equipment, in which wheel brakes are each connected between the orifices and the master cylinder via normally open electromagnetic valves and in which normally closed electromagnetic valves are each connected between the wheel brakes and reservoirs to which the suction vents of the pumps are connected.

In the third aspect of the present invention, the object above can be accomplished by an anti-lock brake control apparatus for a vehicle, in which the base is provided with an insertion hole having a large-diameter portion at an end on the side of the connecting hole and a small-diameter portion at the other end on the side of the return pump and damper, the insertion hole being coaxial with the connecting holes, in which the sheet pipe fitted into the large-diameter portion and the orifices fitted into the small-diameter portion are coaxially and integrally coupled via a coupling pipe portion and in which communicating holes each coupled to the entry sides of normally open electromagnetic valves are bored in the side wall of the coupling pipe portion for communicating the inside of the communicating holes with entry passages of the base.

In the fourth aspect of the present invention, in addition to the arrangement made in the third aspect thereof, the insertion hole has an intermediate stepped portion whose diameter is smaller than that of the large-diameter portion and greater than that of the small-diameter portion and in which an annular passage communicating with the communicating holes is formed between the outer surface of the coupling pipe portion and the inner surface of the intermediate portion of the insertion hole, the entry passage communicating with the annular passage being provided in the base.

DESCRIPTION OF THE PREFERRED EMBODIMENTS

Referring to the accompanying drawings, a description will subsequently be given of embodiments of the present invention applied to a reflux anti-lock brake control apparatus for a four-wheel vehicle.

Figure 1:
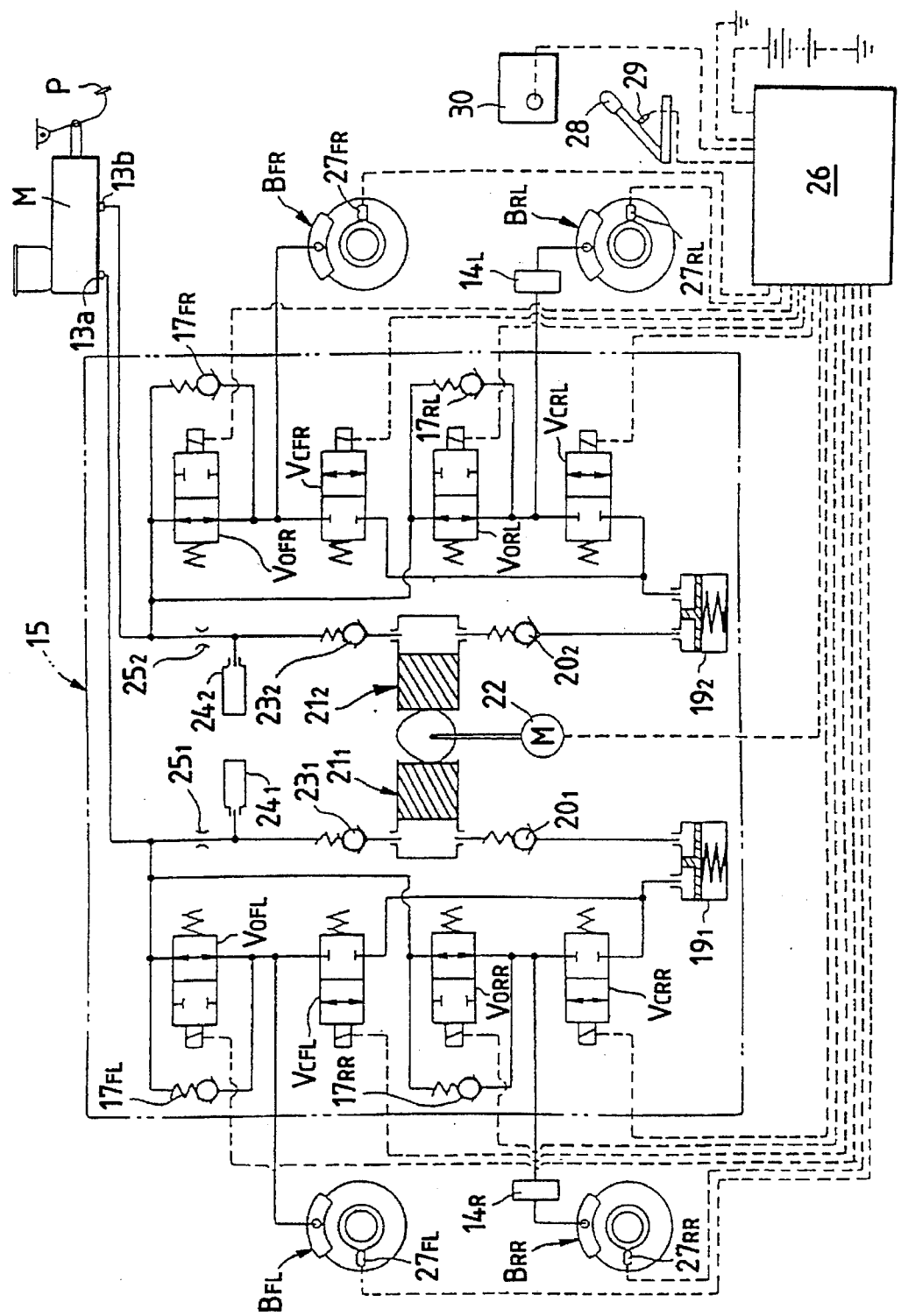
FIG. 1 is a hydraulic circuit diagram of a brake gear for a vehicle in a first embodiment of the present invention.

FIGS. 1 through 10 show a first embodiment of the present invention. In FIG. 1, a tandem type master cylinder M serving as a hydraulic equipment is equipped with a pair of output ports 13a, 13b for outputting a braking hydraulic pressure in proportion to the depression force applied onto a foot brake pedal P. An anti-lock brake control apparatus 15 is provided among a left-hand front wheel brake $B_{FL}$, a proportional pressure reducing valve $14_R$ connected to a right-hand rear wheel brake $B_{RR}$, a right-hand front wheel brake $B_{FR}$, a proportional pressure reducing valve $14_L$ connected to a left-hand rear wheel brake $B_{RL}$, and both the output ports 13a, 13b.

The anti-lock brake control apparatus 15 includes four normally open electromagnetic valves $V_{OFL}$, $V_{ORR}$, $V_{OFR}$, $V_{ORL}$ (hereinafter, referred as $V_{OFL}$-$V_{ORL}$) individually corresponding to the left-hand front wheel brake $B_{FL}$, the right-hand rear wheel brake $B_{RR}$, the right-hand front wheel brake $B_{FR}$ and the left-hand rear wheel brake $B_{RL}$; four checking valves $17_{FL}$, $17_{RR}$, $17_{FR}$, $17_{RL}$ connected to the respective normally open electromagnetic valves $V_{OFL}$-$V_{ORL}$ in parallel; four normally closed electromagnetic valves $V_{CFL}$, $V_{CRR}$, $V_{CFR}$, $V_{CRL}$ (hereinafter, referred as $V_{CFL}$-$V_{CRL}$) individually corresponding to the respective wheel brakes $B_{FL}$-$B_{RL}$; a pair of reservoirs $19_1$, $19_2$ individually corresponding to the sides of the left-hand front wheel brake $B_{FL}$ and the right-hand rear wheel brake $B_{RR}$ and to those of the right-hand front wheel brake $B_{FR}$ and the left-hand rear wheel brake $B_{RL}$; a pair of return pumps $21_1$, $21_2$ each connected via suction valves $20_1$, $20_2$ to both the reservoirs $19_1$, $19_2$; a motor 22 for actuating both the return pumps $21_1$, $21_2$; a pair of dampers $24_1$, $24_2$ connected via discharge valves $23_1$, $23_2$ to both the return pumps $21_1$, $21_2$; and orifices $25_1$, $25_2$ each interposed between the output ports 13a, 13b of the master cylinder M and the return pumps $21_1$, $21_2$. An electronic control unit 26 operates to demagnetize and excite each of the normally open electromagnetic valves $V_{OFL}$-$V_{ORL}$ and normally closed electromagnetic valves $V_{CFL}$-$V_{CRL}$.

The normally open electromagnetic valve $V_{OFL}$ is provided between an output port 13a of the master cylinder M and the left-hand front wheel brake $B_{FL}$. The normally open electromagnetic valve $V_{ORR}$ is provided between the output port 13a and the proportional pressure reducing valve $14_R$ connected to the right-hand rear wheel brake $B_{RR}$. The normally open electromagnetic valve $V_{OFR}$ is provided between another output port 13b of the master cylinder M and the right-hand front wheel brake $B_{FR}$. The normally open electromagnetic valve $V_{ORL}$ is provided between the output port 13b and the proportional pressure reducing valve $14_L$ connected to the left-hand rear wheel brake $B_{RL}$. The checking valves $17_{FL}$-$17_{RL}$ are connected to the respective normally open electromagnetic valves in parallel to allow hydraulic fluid to flow out of only the corresponding wheel brakes $B_{FL}$-$B_{RL}$.

The normally closed electromagnetic valve $V_{CFL}$ is provided between the left-hand front wheel brake $B_{FL}$ and the reservoir $19_1$. The normally open electromagnetic valve $V_{CRR}$ is provided between the proportional pressure reducing valve $14_R$ and the reservoir $19_1$. The normally closed electromagnetic valve $V_{CFR}$ is provided between the right-hand front wheel brake $B_{FR}$ and the reservoir $19_2$. The normally closed electromagnetic valve $V_{CRL}$ is provided between the proportional pressure reducing valve $14_L$ and the reservoir $19_2$.

According to the anti-lock brake control apparatus 15, the normally open electromagnetic valves $V_{OFL}$-$V_{ORL}$ remain demagnetized and consequently remain open, whereas the normally closed electromagnetic valves $V_{CFL}$-$V_{CRL}$ also remain demagnetized and consequently remain closed when the normally braking is operated; that is, each wheel is unlikely to be locked. Therefore, the braking hydraulic pressure output from the output port 13a of the master cylinder M acts on the left-hand front wheel brake $B_{FL}$ via the normally open electromagnetic valve $V_{OFL}$ while acting on the right-hand rear wheel brake $B_{RR}$ via the normally open electromagnetic valve $V_{ORR}$ and the proportional pressure reducing valve $14_R$. Moreover, the braking hydraulic pressure output from the output port 13b of the master cylinder M acts on the right-hand front wheel brake $B_{FR}$ via the normally open electromagnetic valve $V_{OFR}$ while acting on the left-hand rear wheel brake $B_{RL}$ via the normally open electromagnetic valve $V_{ORL}$ and the proportional pressure reducing valve $14_R$.

In the anti-lock condition to make the wheel likely to be locked at the braking, while some of the normally open electromagnetic valves $V_{OFL}$-$V_{ORL}$ corresponding to the wheels like to be locked are excited to close them, the normally closed electromagnetic valves $V_{CFL}$-$V_{CRL}$ corresponding to the wheels above are excited to open them. Thus, part of the braking hydraulic pressure is released into the reservoir $19_1$ or $19_2$, so that the pressure is reduced. In order to hold the braking hydraulic pressure, the normally open electromagnetic valves $V_{OFL}$-$V_{ORL}$ are excited to close them while the normally closed electromagnetic valves $V_{CFL}$-$V_{CRL}$ are demagnetized to keep them closed. On the other hand, in order to increase the braking hydraulic pressure, the normally closed electromagnetic valves $V_{CFL}$-$V_{CRL}$ are demagnetized to keep them closed while the normally open electromagnetic valves $V_{OFL}$-$V_{ORL}$ are demagnetized to open them.

Therefore, the motor 22 for con only driving the pair of return pumps $21_1$, $21_2$ is operated at the anti-lock braking time above. The hydraulic fluid released into the reservoir $19_1$, $19_2$ is forced back to the upstream sides of the normally open electromagnetic valves $V_{OFL}$-$V_{ORL}$ via the return pumps $21_1$, $21_2$, the dampers $24_1$, $24_2$ and the orifices $25_1$, $25_2$. In consequence, the quantity depressing on the foot brake pedal in the master cylinder M is set free from increasing to the extent the pressure has been released into the reservoir $19_1$, $19_2$. Moreover, the pulsation transmitted from the return pumps $21_1$, $21_2$ is attenuated because of the function of the dampers $24_1$, $24_2$ and the orifices $25_1$, $25_2$. Therefore, the pulsation is not transmitted to the brake pedal P.

Signals detected by wheel velocity sensors $27_{FL}$, $27_{RR}$, $27_{FR}$, $27_{RL}$ for individually detecting the velocity of each wheel so as to determined whether the wheel is likely to be locked are input to the electronic control unit 26 for controlling the demagnetization and excitation of the normally open electromagnetic valves $V_{OFL}$–$V_{ORL}$ and the normally closed electromagnetic valves $V_{CFL}$–$V_{CRL}$. Further, the electronic control unit 26 receives a signal detected by a hand brake detection sensor 29 for detecting whether a hand brake lever 28 has been operated. Moreover, the electronic control unit 26 connects an alarm 30 such as a lamp to be actuated by the electronic control unit 26 in the anti-lock condition.

Figure 2:
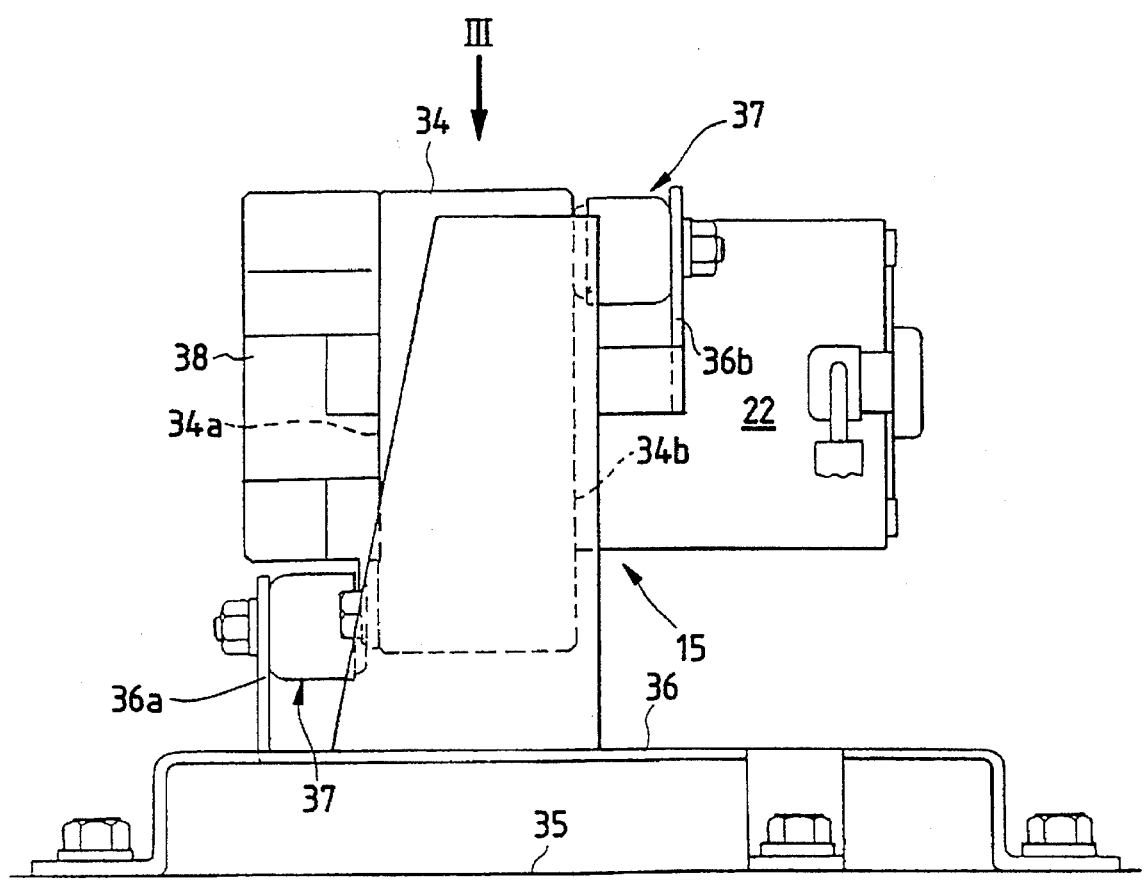
FIG. 2 is a side view of an anti-lock brake control apparatus being supported on a vehicle body.
Figure 3:
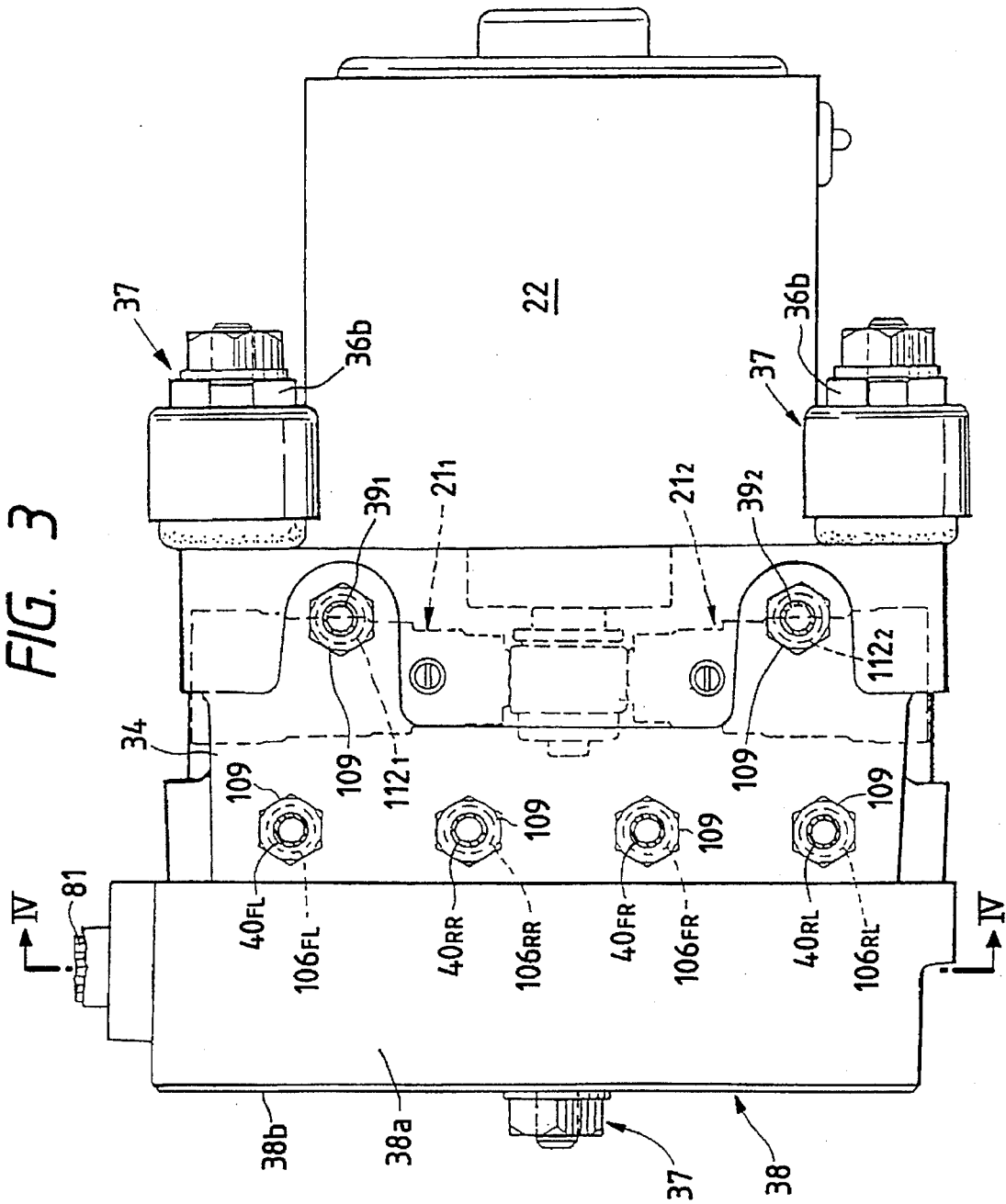
FIG. 3 is an enlarged top view taken in the direction of an arrow III of FIG. 2.
Figure 4:
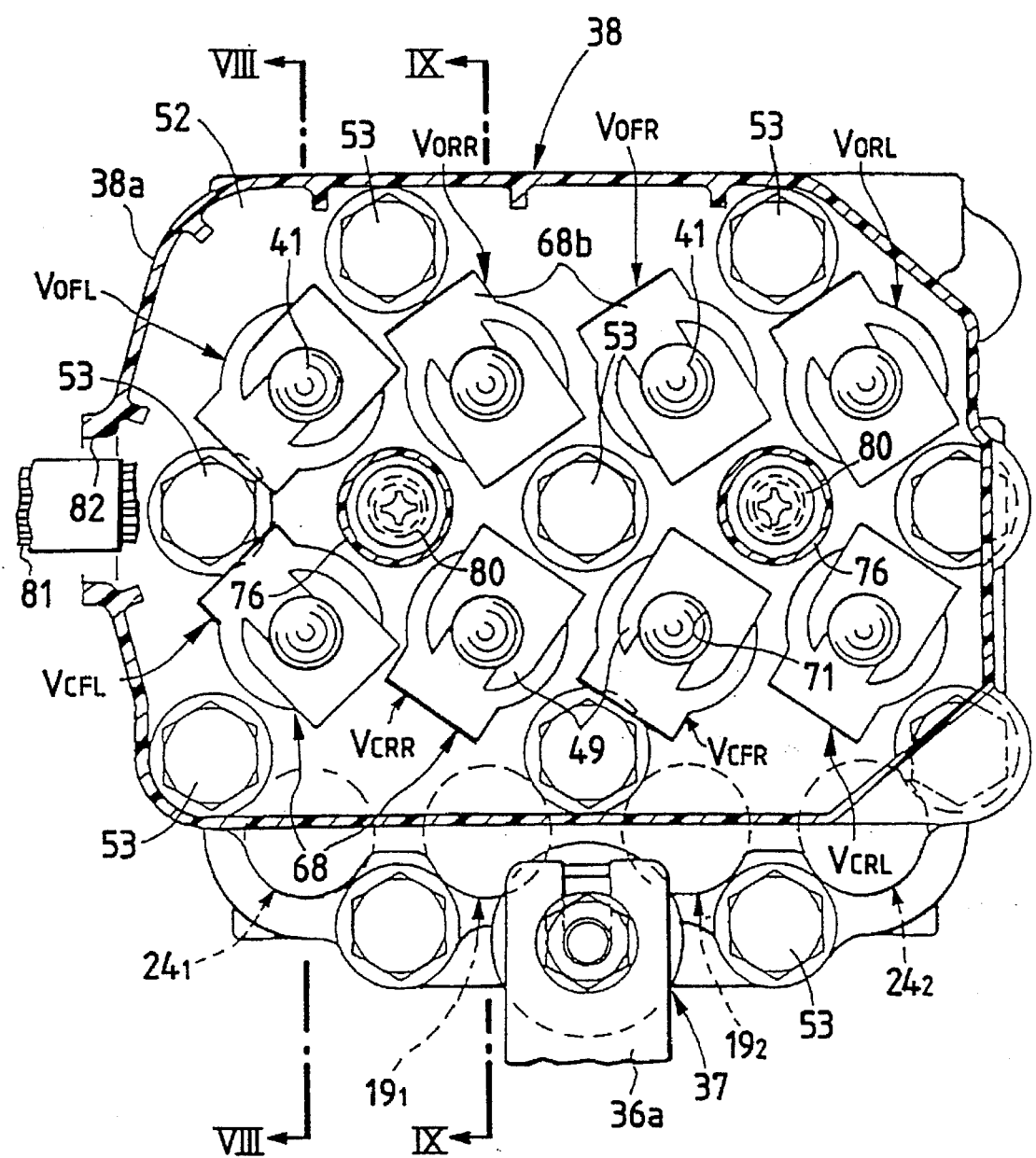
FIG. 4 is a sectional view taken on line IV—IV of FIG. 3.

As shown in FIGS. 2, 3 and 4, the anti-lock brake control apparatus 15 is equipped with a metal base 34 in the form of a block. The base 34 includes: the four normally open electromagnetic valves $V_{OFL}$, $V_{ORR}$, $V_{OFR}$, $V_{ORL}$; the four normally closed electromagnetic valves $V_{CFL}$, $V_{CRR}$, $V_{CFR}$, $V_{CRL}$; the four checking valves $17_{FL}$, $17_{RR}$, $17_{FR}$, $17_{RL}$; the pair of reservoirs $19_1$, $19_2$; the pair of suction valves $20_1$, $20_2$; the pair of return pumps $21_1$, $21_2$; the pair of discharge valves $23_1$, $23_2$; the pair of dampers $24_1$, $24_2$; the pair of orifices $25_1$, $25_2$ and the like. In addition, a cover 38 is fitted to a surface 34a of the base 34 in such a manner as to cover a part of the normally open electromagnetic valves $V_{OFL}$, $V_{ORR}$, $V_{OFR}$, $V_{ORL}$ and the normally closed electromagnetic valves $V_{CFL}$, $V_{CRR}$, $V_{CFR}$, $V_{CRL}$ projecting from the surface 34a. Further, the motor 22 is mounted on another surface 34b of the base 34.

The base 34 is mounted on a vehicle body 35. More specifically, a support plate 36a facing the surface 34a of the base 34 and a pair of support plates 36b, 36b facing the surface 34b thereof are provided for a bracket 36 secured to the vehicle body 35. The base 34 is fitted to the support plate 36a and the support plates 36b, 36b via mounting devices 37, respectively.

In the base 34, the four normally open electromagnetic valves $V_{OFL}$, $V_{ORR}$, $V_{OFR}$, $V_{ORL}$ are provided in parallel. The four normally closed electromagnetic valves $V_{CFL}$, $V_{CRR}$, $V_{CFR}$, $V_{CRL}$ are provided in parallel in the direction in which the normally open electromagnetic valves $V_{OFL}$–$V_{ORL}$ are disposed. Moreover, an input conduit $39_1$ coupling to the output port 13a (see FIG. 1) of the master cylinder M is connected to a surface of the base 34 corresponding to the normally open electromagnetic valves $V_{OFL}$, $V_{ORR}$. An input conduit $39_2$ coupling to the output port 13b (see FIG. 1) of the master cylinder M is connected to the surface of the base 34 corresponding to the normally open electromagnetic valves $V_{OFR}$, $V_{ORL}$. Further, output conduits $40_{FL}$, $40_{RR}$, $40_{FR}$, $40_{RL}$, each coupling to the wheel brakes $B_{FL}$, $B_{RR}$, $B_{FR}$, $B_{RL}$, are connected to the surface of the base 34 corresponding to the normally open electromagnetic valve $V_{OFL}$ and the normally closed electromagnetic valve $V_{CFL}$; the normally open electromagnetic valve $V_{ORR}$ and the normally closed electromagnetic valve $V_{CRR}$; the normally open electromagnetic valve $V_{OFR}$ and the normally closed electromagnetic valve $V_{CFR}$; and the normally open electromagnetic valve $V_{ORL}$ and normally closed electromagnetic valve $V_{CRL}$, respectively.

Since the normally open electromagnetic valves $V_{OFL}$, $V_{ORR}$, $V_{OFR}$, $V_{ORL}$ are basically similar in construction to each other and so are the normally closed electromagnetic valves $V_{CFL}$, $V_{CRR}$, $V_{CFR}$, $V_{CRL}$, a detailed description will subsequently be given of the construction of the normally open electromagnetic valve $V_{OFL}$ and the normally closed electromagnetic valve $V_{CFL}$ as those representing the normally open electromagnetic valves $V_{OFL}$, $V_{ORR}$, $V_{OFR}$, $V_{ORL}$ and the normally closed electromagnetic valves $V_{CFL}$, $V_{CRR}$, $V_{CFR}$, $V_{CRL}$, respectively.

Figure 5:
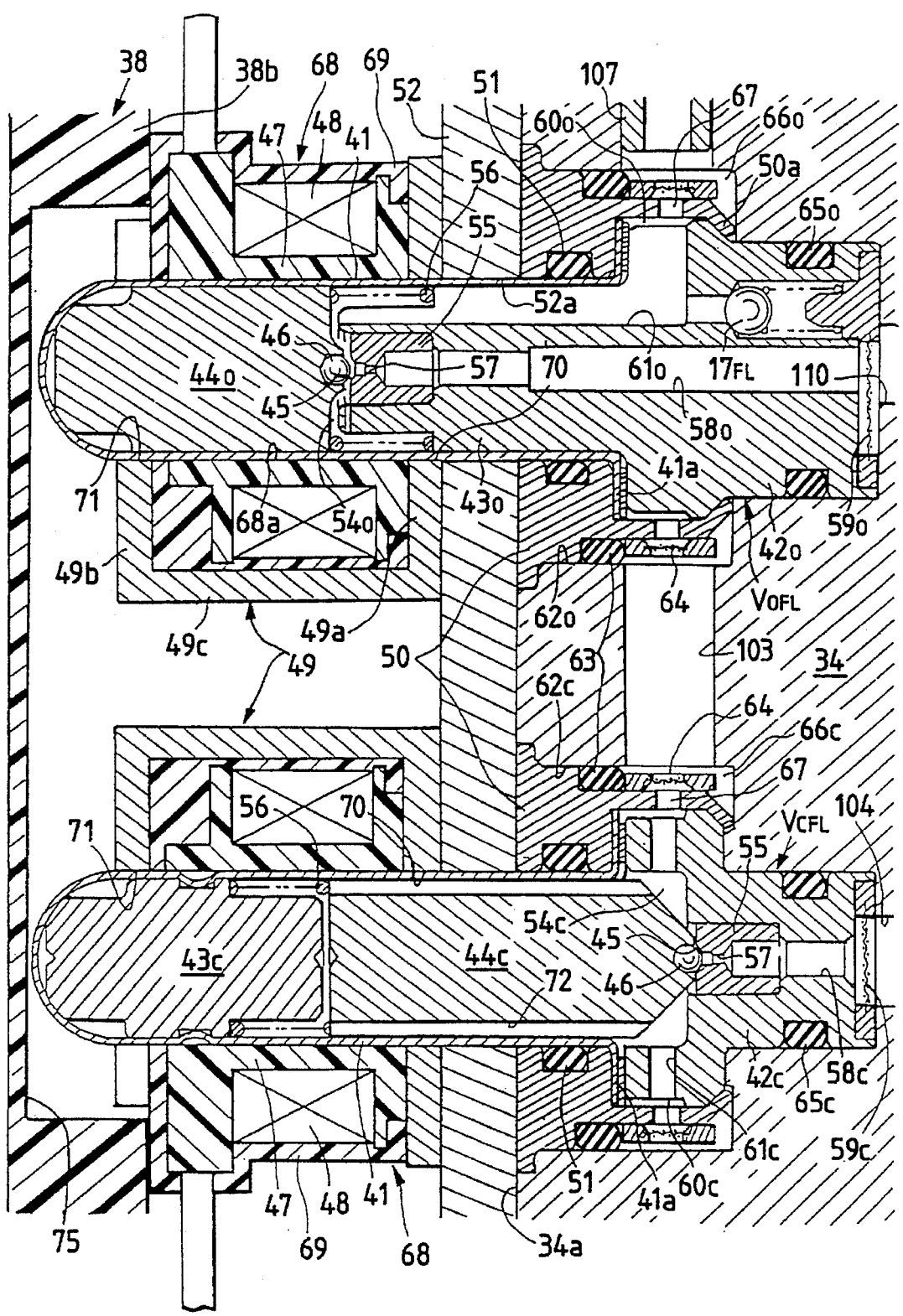
FIG. 5 is a vertical sectional view of normally open and normally closed electromagnetic valves.

In FIG. 5, the normally open electromagnetic valve $V_{OFL}$ includes a main housing body $42_0$ having a cylindrical guide tube 41 with a closed end, a fixed core $43_0$ fixedly placed at an end of the guide tube 41, a movable core $44_0$ urged by a spring in the direction in which it separates from the fixed core $43_0$ and accommodated in the guide tube 41, a spherical valve member 46 allowed to sit on the valve seat 45 provided on the fixed core $43_0$ and firmly secured to the movable core $44_0$, a coil 48 wound on a bobbin 47 surrounding the guide tube 41, and a yoke 49 covering a part of the coil 48 and magnetically coupling between both ends of the guide tube 41.

The main housing body $42_0$ is formed of magnetic metal in a stepped cylindrical shape. A guide tube 41 is formed of a non-magnetic material in a thin-walled cylindrical shape with a closed end. An opening end of the guide tube 41 is liquid-tightly held between the main housing body $42_0$ and a ring member 50 formed of a magnetic material and combined by caulking with the main housing body $42_0$.

A collar 41a outwardly protruding in the radial direction is integrally provided in the opening end of the guide tube 41. The ring member 50 is formed in a ring shape coaxially surrounding on the side of the opening end of the guide tube 41. A thin-walled cylindrical portion 50a coupled by caulking to the main housing body $42_0$ is coaxially provided in the ring member 50. The fixed core $43_0$ formed in a cylindrical shape is coupled to the main housing body $42_0$ integrally and coaxially. When the thin-walled cylindrical portion 50a is coupled by caulking to the main housing body $42_0$ in such a manner that the collar 41a of the guide tube 41 is held between the ring member 50 and the main housing body $42_0$, the fixed core $43_0$ is fitted on side of the opening end of the guide tube 41. Moreover, an annular sealing member 51 is provided between the ring member 50 and the guide tube 41.

A valve chamber $54_0$ is formed between the fixed core $43_0$ and the movable core $44_0$ within the guide tube 41. A valve seat member 55 having the tapered valve seat 45 is secured to the end portion of the fixed core $43_0$ in the center thereof facing the valve chamber $54_0$. The valve member 46 is secured to the end portion of the movable core $44_0$ in the center thereof facing the valve chamber $54_0$. Moreover, a compressed return spring 56 exhibiting the spring force in the direction in which the movable core $44_0$ is separated from the fixed core $43_0$, that is, the valve member 46 is separated from the valve seat 45, is provided between the fixed core $43_0$ and the movable core $44_0$ within the valve chamber $54_0$.

The valve seat member 55 has a valve hole 57 open in the central portion of the valve seat 45. The fixed core $43_0$ and the main housing body $42_0$ are provided with a passage $58_0$ communicating with the valve hole 57 coaxially. A filter $59_0$ facing the opening end of the passage $58_0$ is fitted to the end portion of the main housing body $42_0$ on the opposite side of the fixed core $43_0$. Further, an annular passage $60_0$ is formed between the thin-walled cylindrical portion 50a of the ring member 50 and the main housing body $42_0$. A communicating passage $61_0$ for communicating the annular passage $60_0$ to the valve chamber $54_0$ is provided in the fixed core $43_0$ and the main housing body $42_0$. Further, the main housing body $42_0$ is provided with the checking valve $17_{FL}$ between the filter $59_0$ and the communicating passage $61_0$.

The main housing body $42_O$ and the ring member 50 are fitted into a mating recess $62_O$ formed in the surface 34a of the base 34 in such a way that the ring member 50 is substantially aligned with the same face as the surface 34a of the base 34. The mating recess $62_O$ is formed as a stepped closed-end hole corresponding to the outer shape of the main housing body $42_O$ and the ring member 50. An annular sealing member 63 resiliently contacting with the inner surface of the mating recess $62_O$ is fitted to the outer surface of the ring member 50. An annular filter 64 is provided relative to the inner surface of the mating recess $62_O$ and the annular sealing member 63. An annular sealing member $65_O$ resiliently contacting with the inner surface of the mating recess $62_O$ is fitted to the outer surface of the main housing body $42_O$. Further, an annular chamber $66_O$ is formed between the outer surfaces of both the main housing body $42_O$ and the ring member 50, and the inner surface of the mating recess $62_O$. The annular chamber $66_O$ communicates with the annular passage $60_O$ via a plurality of communicating holes 67 bored in the filter 64 and the thin-walled cylindrical portion 50a of the ring member 50.

A press plate 52 formed of magnetic metal and having a plurality of holes 52a to be passed through each guide tube 41 is securely fastened to the surface of the base 34 with a plurality of bolts 53 (see FIG. 4). The main housing body $42_O$ and the ring member 50 are fixedly held between the press plate 52 and the base 34 in the state that they are fitted into the mating recess $62_O$.

The bobbin 47 and the coil 48 are covered with a mold portion 69 formed of a synthetic resin, so that it is formed into a unit serving as a cylindrical coil assembly 68 having a fitting hole 68a. A projection from the press plate 52 of the guide tube 41 is fitted into the fitting hole 68a of the coil assembly 68. The yoke 49 is fitted to the coil assembly 68.

The yoke 49 has a first flat plate 49a which abuts against an end side of the coil assembly 68 and is interposed between the coil assembly 68 and the press plate 52, a second flat plate 49b abutting against another end side of the coil assembly 68, and a coupling plate 49c for connecting the first and second flat plates 49a, 49b. The yoke 49 is U-shaped in vertical cross section with the magnetic metal. The first flat plate 49a is provided with a circular through-hole 70 coaxially coupling to the fitting hole 68a of the coil assembly 68. The second flat plate 49b is provided with a through-hole 71 coupling to the mating hole 68a thereof. Consequently, the through-hole 71 of the second flat plate 49b is formed in a circular shape. The through-hole 71 can also has an arcuate inner peripheral face with a part thereof being cut out in the circumferential direction.

The projection of the guide tube 41 is fitted from the press plate 52 into the coil assembly 68 mounting the yoke 49. That is, the guide tube 41 is fitted into the through-holes 70, 71 of the yoke 49 and into the fitting hole 68a of the coil assembly 68. The whole inner surface of the through-hole 70 contacts the outer surface of the guide tube 41, whereas a circumferential part of the inner surface of the through-hole 71 contacts the outer surface of the guide tube 41, so that both end portions of the guide tube 41 holding the coil assembly 68 therebetween and are magnetically coupled to each other therein.

Since component elements of the normally closed electromagnetic valves $V_{CFL}$–$V_{CRL}$ are substantially similar to those of the normally open electromagnetic valves $V_{OFL}$–$V_{ORL}$, like reference characters are given to like component elements of the normally closed electromagnetic valves $V_{CFL}$–$V_{CRL}$, and a description will be given of the construction of the normally closed electromagnetic valve $V_{CFL}$ by reference to FIG. 5 again.

The normally closed electromagnetic valve $V_{CFL}$ includes a main housing body $42_C$ having the closed-end cylindrical guide tube 41, a fixed core $43_C$ fixed to the end of the guide tube 41, a movable core $44_C$ urged by the spring in the direction away from the fixed core $43_C$ and accommodated in the guide tube 41. The normally closed electromagnetic valve $V_{CFL}$ further includes the valve member 46 allowed to sit onto the valve seat 45 provided in the main housing body $42_C$ and firmly secured to the movable core $44_C$, the coil 48 wound on the bobbin 47 surrounding the guide tube 41, and the yoke 49 covering a part of the coil 48 and magnetically coupling between both end portions of the guide tube 41.

The main housing body $42_C$ is so arranged that the opening end of the guide tube 41 with a thin-walled and a closed-end shapes is liquid-tightly held between the main housing body $42_C$ with a stepped cylindrical body made of magnetic material and the ring member 50 made of magnetic material, the ring member 50 being combined by caulking with the main housing body $42_C$.

The thin-walled cylindrical portion 50a of the ring member 50 is coupled by caulking to the main housing body $42_C$ in such a manner as to hold the collar 41a of the guide tube 41 between the ring member 50 and the main housing body $42_C$, and the annular sealing member 51 is provided between the ring member 50 and the guide tube 41. Moreover, the fixed core $43_C$ is fitted into the end of the guide tube 41 and by caulking the guide tube 41 to mate it with the fixed core $43_C$, so that the fixed core $43_C$ is fixed in the guide tube 41.

The movable core $44_C$ is slidably fitted into the guide tube 41 opposite to the movable core $43_C$. A valve chamber $54_C$ is formed between the main housing body $42_C$ and the movable core $44_C$. The valve seat member 55 having the tapered valve seat 45 is secured to the end portion of the main housing body $42_C$ in the center thereof facing the valve chamber $54_C$. The valve member 46 is secured to the central end portion of the movable core $44_C$ in the center thereof facing the valve chamber $54_C$. Moreover, the compressed return spring 56 exhibiting the spring force in the direction in which the movable core $44_C$ is separated from the fixed core $43_C$, that is, the valve member 46 is seated in the valve seat 45, is provided between the fixed core $43_C$ and the movable core $44_C$ within the guide tube 41. Further, a flow groove 72 which allows the hydraulic fluid to flow is axially provided over the whole length of the outer surface of the movable core $44_C$.

The main housing body $42_C$ is provided with a passage $58_C$ communicating with the valve hole 57 of the valve seat member 55 coaxially. A filter $59_C$ facing the opening end of the passage $58_C$ is fitted to the end portion of the main housing body $42_C$ opposite to the movable core $44_C$. Further, an annular passage $60_C$ is formed between the thin-walled cylindrical portion 50a of the ring member 50 and the main housing body $42_C$. A plurality of communicating passages $61_C$ for communicating the annular passage $60_C$ with the valve chamber $54_C$ are provided in the main housing body $42_C$.

The main housing body $42_C$ is fitted into a mating recess $62_C$ formed in the surface 34a of the base 34 in such a way that the ring member 50 is substantially aligned with the same face as the surface 34a of the base 34. The mating recess $62_C$ is formed as a stepped closed-end hole corresponding to the outer shape of the main housing body $42_C$ and the ring member 50. The annular sealing member 63 in resilient contact with the inner surface of the mating recess $62_C$ is fitted to the outer surface of the ring member 50. The annular filter 64 is provided relative to the inner surface of the mating recess $62_C$ and the annular sealing member 63. An annular sealing member $65_C$ in resilient contact with the inner surface of the mating recess $62_C$ is fitted to the outer surface of the main housing body $42_C$. Further, an annular chamber $66_C$ is formed between the inner surface of the mating recess $62_C$ and the outer surfaces of both the main housing body $42_C$ and the ring member 50. The annular chamber $66_C$ communicates with the annular passage $60_C$ via the plurality of communicating holes 67 of the filter 64 and the thin-walled cylindrical portion $50a$.

The main housing body $42_C$ of the normally closed electromagnetic valves $V_{CFL}$-$V_{CRL}$ is secured to the base 34 by fastening the press plate 52 to the surface $34a$ of the base 34 in a similar manner with the main housing body $42_O$ of the normally open electromagnetic valves $V_{OFL}$-$V_{ORL}$. The guide tube 41 projects from the press plate 52 so that the guide tube 41 is fitted into the coil assembly 68 mounting the yoke 49.

In all of the normally open electromagnetic valves $V_{OFL}$-$V_{ORL}$ and the normally closed electromagnetic valves $V_{CFL}$-$V_{CRL}$, the coil assemblies each fitted with the yoke 49 are held between the synthetic resin cover 38 and the press plate 52 so that the coil assemblies are covered with the cover 38 securely fastened to the base 34.

Figure 6:
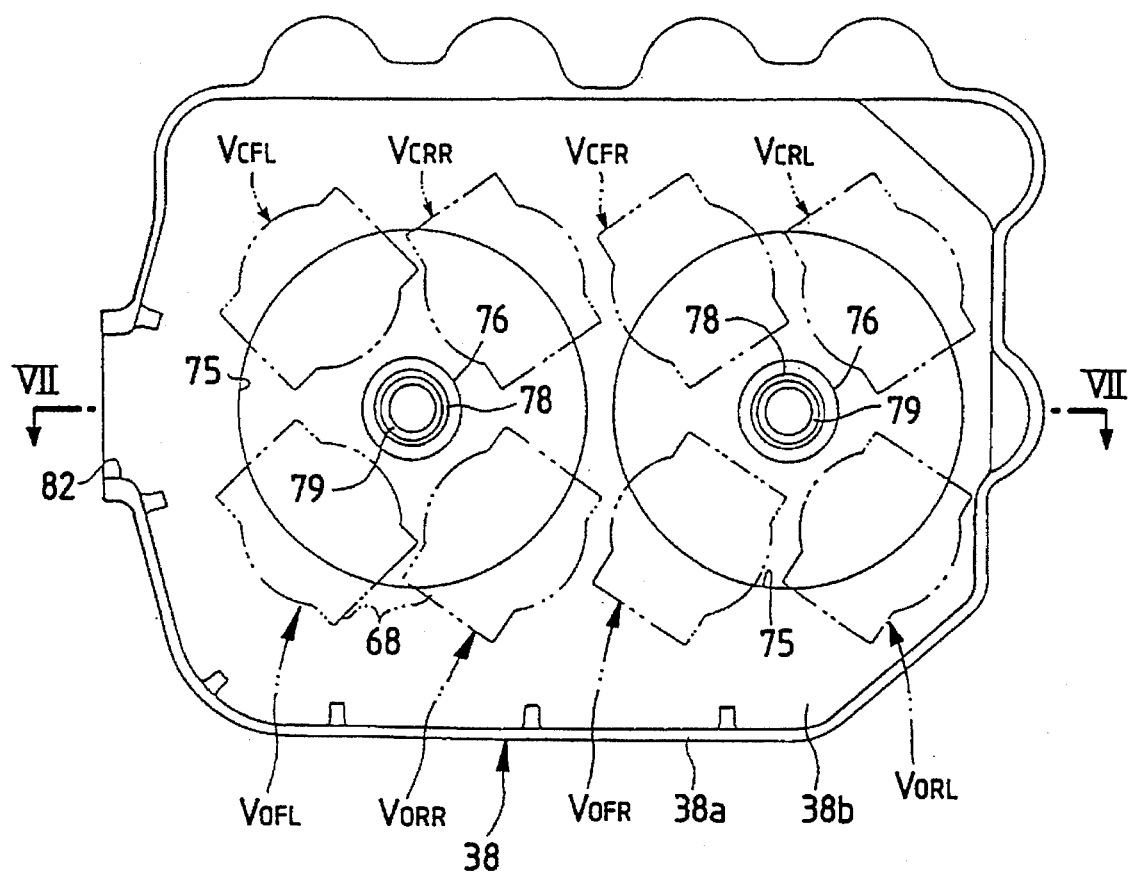
FIG. 6 is a bottom view of a cover taken in the direction of an arrow VI of FIG. 7.
Figure 7:
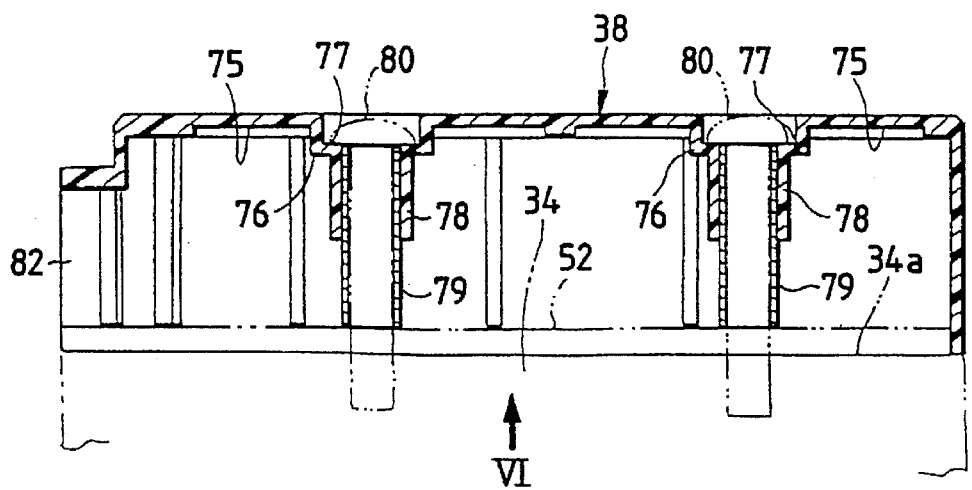
FIG. 7 is a sectional view taken on line VII—VII of FIG. 6.

As shown in FIGS. 6 and 7, the cover 38 is in the form of a case with a cylindrical side wall portion $38a$ formed in a substantially rectangular shape and having ends abutting against the base 34 and the press plate 52, and with a closing plate portion $38b$ closing the other end of the side wall portion $38a$. Moreover, a pair of recesses 75, 75 are formed in circular shapes with center points corresponding to the central positions around which the first group of the normally open electromagnetic valves $V_{OFL}$, $V_{ORR}$ and the normally closed electromagnetic valves $V_{CFL}$, $V_{CRR}$, and the second group of the normally open electromagnetic valves $V_{OFR}$, $V_{CRL}$ and the normally closed electromagnetic valves $V_{CFR}$, $V_{CRL}$ are located, respectively. The recesses 75, 75 are provided in the inner surface of the closing plate portion $38b$. Further, the diameter of the recess 75 is so set that the peripheral portion of the recess 75 abuts the coil assemblies 68 in the normally open electromagnetic valves $V_{OFL}$, $V_{ORR}$ and the normally closed electromagnetic valves $V_{CFL}$, $V_{CRR}$ corresponding to the recess 75. The diameter of another recess 75 is so set that the closing plate portion $38b$ abuts the coil assemblies 68 in the normally open electromagnetic valves $V_{OFR}$, $V_{ORL}$ and the normally closed electromagnetic valves $V_{CRR}$, $V_{CRL}$ on the peripheral portion of the corresponding recess 75.

In the central portions of both the recesses 75, 75, the closing plate portion $38b$ is provided with large-diameter mating tubes 76, 76 extending inwardly and small-diameter mating tubes 78, 78 coaxially coupling via stepped portions 77, 77 to the large-diameter mating tubes 76, 76, respectively. Spacers 79, 79 cylindrically formed of metal are each fitted into the small-diameter mating tubes 78, 78. Then clamping screws 80, 80 are each passed through the spacers 79, 79 from the outside of the cover 38 to the press plate 52 to tighten them by screwing the clamping screws 80 into the base 34, so that the cover 38 is securely fastened to the base 34. Further, portions where the recesses 75, 75 are formed in the closing plate portion $38b$ of the cover 38 are thin-walled and applied with a resilient force. The clamping force of the screws 80, 80 acts on the central portions of the recesses 75, 75 to ensure to hold and fix the coil assemblies 68 in the first group of the normally open electromagnetic valves $V_{OFL}$, $V_{ORR}$ and the normally closed electromagnetic valves $V_{CFL}$, $V_{CRR}$, and the coil assemblies 68 in the second group of the normally open electromagnetic valves $V_{OFR}$, $V_{ORL}$ and the normally closed electromagnetic valves $V_{CRR}$, $V_{CRL}$ between the closing plate portion $38b$ of the cover 38 and the press plate 52 by tightening the clamping screws 80, 80.

The side wall portion $38a$ of the cover 38 is provided with a cord outlet 82 for drawing out connecting cords 81 (see FIG. 4) each coupling to the coils 48 of the normally open electromagnetic valves $V_{OFL}$-$V_{ORL}$ and the normally closed electromagnetic valves $V_{CFL}$-$V_{CRL}$.

AS shown in FIG. 4, the damper $24_1$ is provided in the base 34 on the opposite side of the normally open electromagnetic valve $V_{OFL}$ with respect to the normally closed electromagnetic valve $V_{CFL}$. The damper $24_2$ is provided in the base 34 on the opposite side of the normally open electromagnetic valve $V_{OFR}$ with respect to the normally closed electromagnetic valve $V_{CFR}$. Moreover, the reservoir $19_1$ is provided in the base 34 on the opposite side of the normally open electromagnetic valve $V_{CRR}$ with respect to the normally closed electromagnetic valve $V_{ORR}$. The reservoir $19_2$ is provided in the base 34 on the opposite side of the normally open electromagnetic valve $V_{ORL}$ with respect to the normally closed electromagnetic valve $V_{CRL}$.

Figure 8:
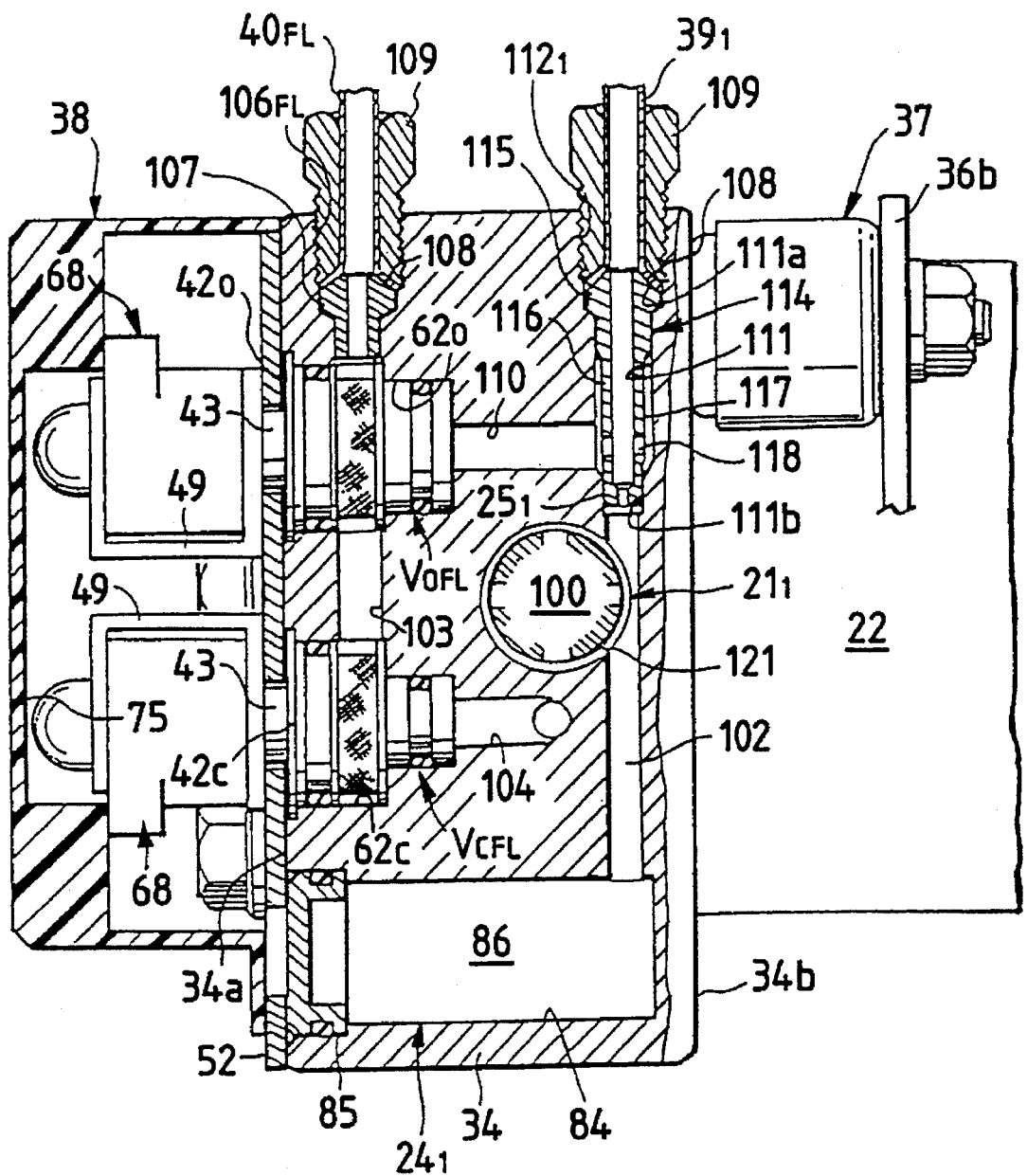
FIG. 8 is a sectional view taken on line VIII—VIII of FIG. 4.

As shown in FIG. 8, the surface $34a$ of the base 34 is provided with a damper recess 84 on the opposite side of the normally open electromagnetic valve $V_{OFL}$ with respect to the normally closed electromagnetic valve $V_{CFL}$. The damper $24_1$ is so arranged that the opening end of the damper recess 84 is liquid-tightly closed with a closing plate 85 fixedly held between the base 34 and the press plate 52 fastened to the surface $34a$ of the base 34. A damper chamber 86 is regulated by the damper recess 84 and the closing plate 85. The damper $24_2$ is arranged like the damper $24_1$ on the opposite side of the normally open electromagnetic valve $V_{OFR}$ with respect to the normally closed electromagnetic valve $V_{CFR}$.

Figure 9:
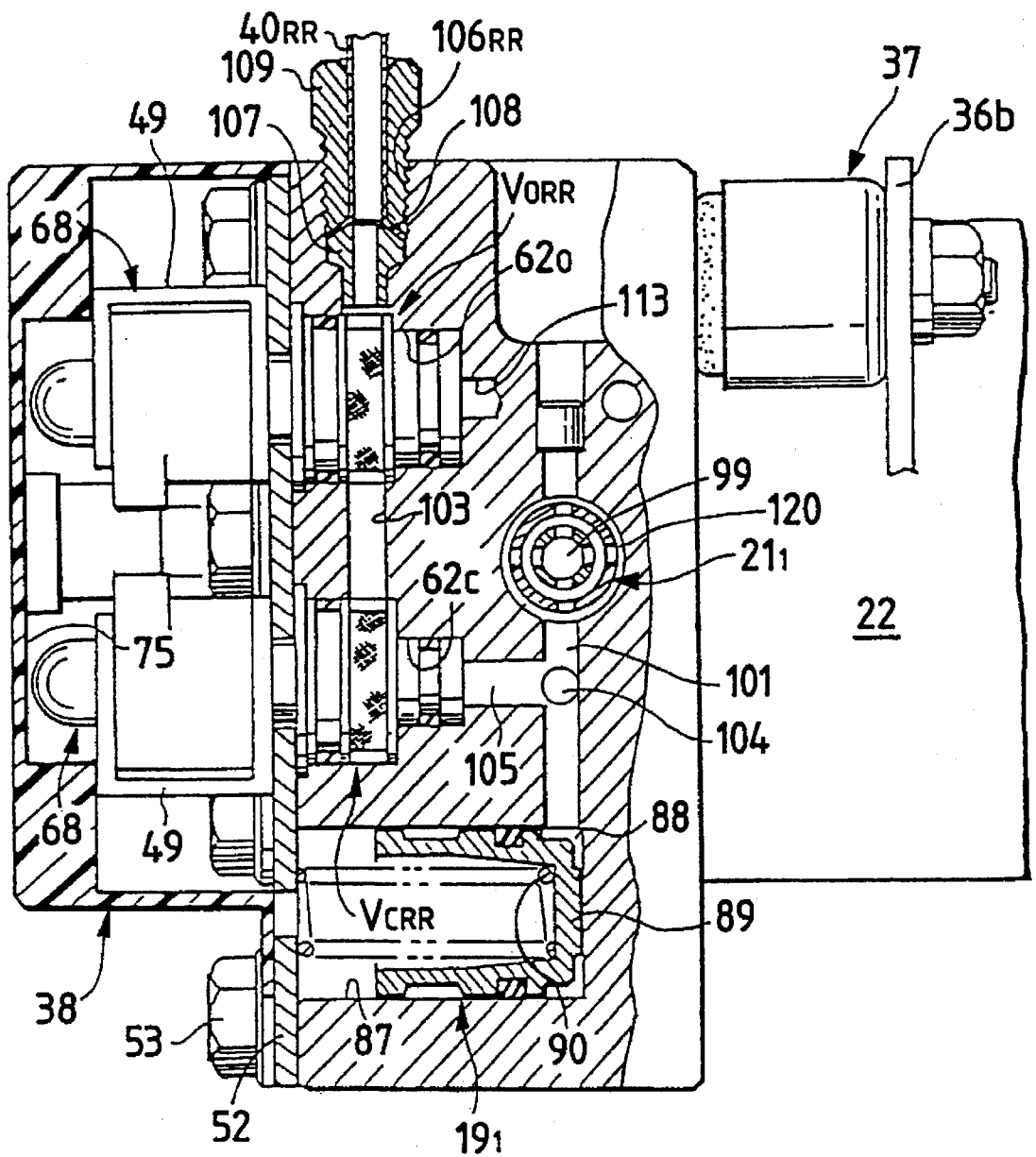
FIG. 9 is a sectional view taken on line IX—IX of FIG. 4.

AS shown in FIG. 9, the surface $34a$ of the base 34 is provided with a reservoir recess 87 on the opposite side of the normally open electromagnetic valve $V_{ORR}$ with respect to the normally closed electromagnetic valve $V_{CRR}$. The reservoir $19_1$ includes a reserve chamber 88 formed between the reservoir recess 87 and the base 34, a piston 89 fitted into the reservoir recess 87 slidably and liquid-tightly, and a spring 90 compressed between to the piston 89 and the press plate 52 securely fastened to the surface $34a$ of the base 34. The reservoir $19_2$ is arranged like the reservoir $19_1$ on the opposite side of the normally open electromagnetic valve $V_{ORL}$ with respect to the normally closed electromagnetic valve $V_{CRL}$.

Figure 10:
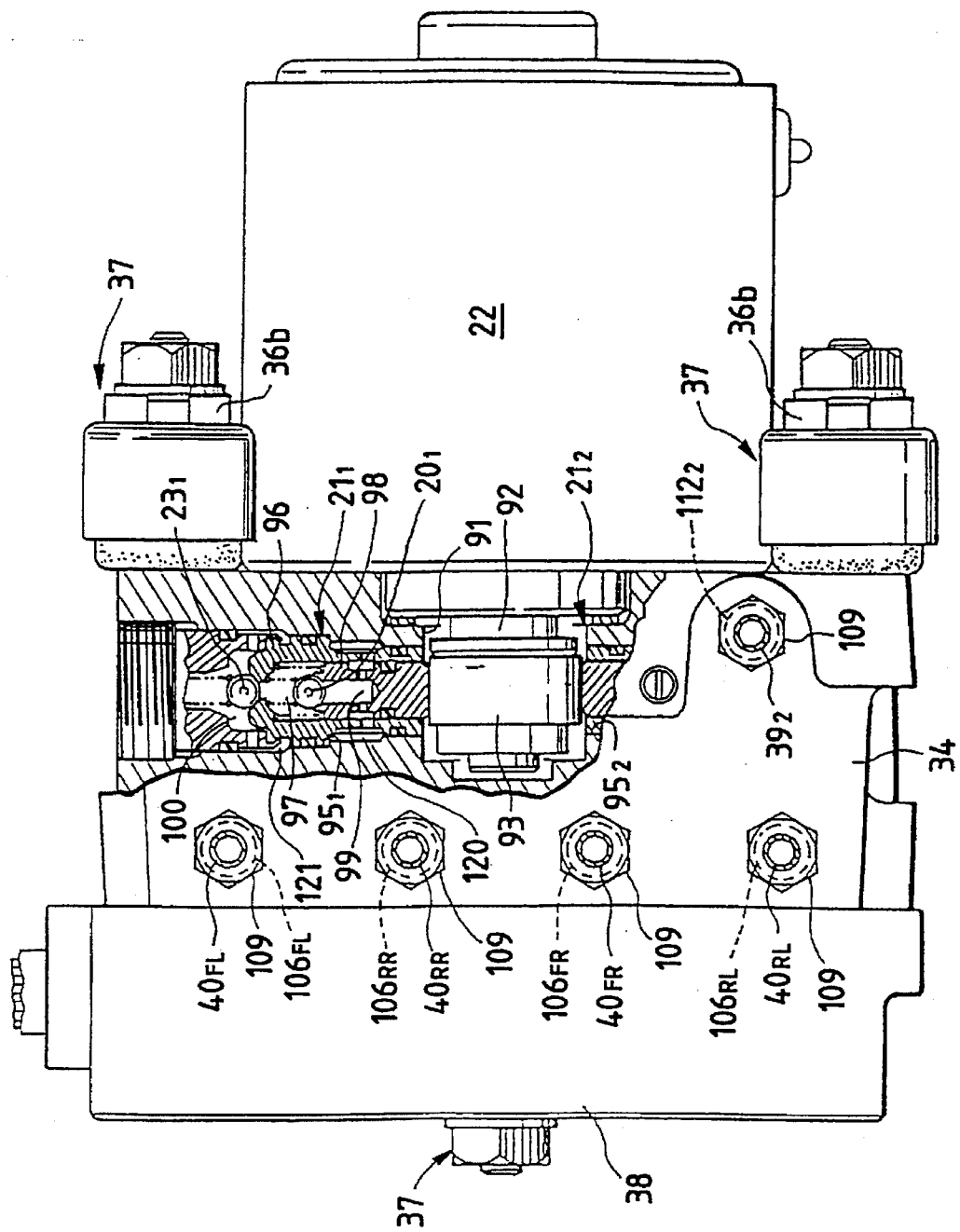
FIG. 10 is a cutaway top view of a return pump taken in the same direction of FIG. 3.

As shown in FIG. 10, a closed-end receiving hole 91 for opening to the surface $34b$ of the base 34 is bored in the central portion of the base 34 along the direction in which the normally open electromagnetic valves $V_{OFL}$-$V_{ORL}$ are arranged and in which the normally closed electromagnetic valves $V_{CFL}$-$V_{CRL}$ are arranged. An output shaft 92 of the motor 22 fitted to the surface $34b$ of the base 34 is coaxially inserted into the receiving hole 91. The output shaft 92 has a cam member 93 fixed thereto in the receiving hole 91, the cam member 93 having an outer surface different in the peripheral distance from the axis of the output shaft 92 to the outer surface.

The base 34 is provided with a pair of fitting holes $95_1$, $95_2$ for opening to the inner surface of the receiving hole 91 and extending along the direction in which the normally open electromagnetic valves $V_{OFL}$-$V_{ORL}$ and the normally closed electromagnetic valves $V_{CFL}$–$VCR_L$ are arranged. The return pumps $21_1$, $21_2$ are located in the fitting holes $95_1$, $95_2$ so that they are driven by the cam member 93.

The return pump $21_1$ includes a pump housing 96 fitted into the fitting hole $95_2$ and fixed therein, and a piston 98 with an end being in slidable contact with the cam member 93 to slidably fit into the pump housing 96, the piston 98 having a pump chamber 97 formed between the pump housing 96 and the piston 98.

Between the inner surface of the fitting hole $95_1$ and the outer surface of the pump housing 96 fitted and fixed in the fitting hole $95_1$, an annular suction passage 120 is formed inwardly in the axial direction of the fitting hole $95_1$, and an annular discharge passage 121 is formed outwardly in the axial direction of the fitting hole $95_1$. The piston 98 includes a suction chamber 99 for communicating with the annular suction passage 120 at all times, and the suction valve $20_1$ for communicating the suction chamber 99 with the pump chamber 97 by opening when the filled capacity of the pump chamber 97 increases. Further, the pump housing 96 includes a discharge chamber 100 kept communicating with the annular discharge passage 121. Moreover, the pump housing 96 includes the discharge valve $23_1$ for communicating the discharge chamber 100 with the pump chamber 97 by opening when the filled capacity of the pump chamber 97 decreases.

As shown in FIG. 9, the base 34 is provided with a suction passage 101 for communicating the lower part of the annular suction passage 120 with the reserve chamber 88 of the reservoir $19_1$. As shown in FIG. 8, the base 34 is provided with a discharge passage 102 for communicating the annular discharge passage 121 with the damper chamber 86 of the damper $24_1$. The discharge passage 102 is formed in the base 34 so that the damper chamber 86 directly communicates with a portion of the annular discharge passage 121 on the side of the motor 22, for example, by extending vertically and linearly. The lower end of the discharge passage 102 thus communicates with the damper chamber 86.

The return pump $21_2$ having the same arrangement as the return pump $21_1$ is fitted and fixed in the fitting hole $95_2$. Communicating passages 103 is formed in the base 34 for connecting the communication between the annular chambers $66_O$, $66_C$ of the normally open and closed electromagnetic valves: $V_{OFL}$, $V_{CFL}$; $V_{ORR}$, $V_{CRR}$; $V_{OFR}$, $V_{CFR}$; and $V_{ORL}$, $V_{CRL}$ arranged adjacent to each other in the base 34. The reservoir $19_1$ is communicated via the suction passage 101 with a discharge passage 104 (see FIG. 9) coaxially coupling to the mating recess $51_C$ in the normally closed electromagnetic valve $V_{CFL}$ and with a discharge passage 105 (see FIG. 10) coaxially coupling to the mating recess $51_C$ in the normally closed electromagnetic valve $V_{CRR}$. Similarly, the discharge passages of the normally closed electromagnetic valves $V_{CFR}$, $V_{CRL}$ communicate with the reservoir $19_2$.

Further, output connecting holes $106_{FL}$, $106_{RR}$, $106_{FR}$, $106_{RL}$ (hereinafter, referred as $106_{FL}$–$106_{RL}$) serving as threaded holes are provided on the surface of the base 34 coaxially with the communicating passages 103. Sheet pipes 107 coupling to the respective communicating passages 103 are forced into the base 34 in such a manner that the sheet pipes 107 are positioned at the inner ends of the connecting holes $106_{FL}$–$106_{RL}$. Tapered flare portions 108, which are capable of adhering closely to the sheet pipes 107, are provided at ends of the output conduits $40_{FL}$, $40_{RR}$, $40_{FR}$, $40_{RL}$ (hereinafter, referred as $40_{FL}$–$40_{RL}$) coupling to the wheel brakes $B_{FL}$, $B_{RR}$, $B_{FR}$, $B_{RL}$, respectively. Screw members 109 fitted to the outer peripheries of the conduits $40_{FL}$–$40_{RL}$ are screwed into the respective connecting holes $106_{FL}$–$106_{RL}$. The flare portions 108 are pressed against the sheet pipes 107 by the screw members 109.

Referring to FIG. 8 specifically, the base 34 includes an entry passage 110 coupling to the mating recess $62_O$ of the normally open electromagnetic valve $V_{OFL}$. The base 34 includes an insertion hole 111 perpendicularly intersecting the entry passage 110 so that the insertion hole 111 coaxially couples to the discharge passage 102 connecting to the annular discharge passage 121 of the return pump $21_1$. Further, the base 34 includes an entry passage 113 (see FIG. 9) coupling to the mating recess $62_O$ of the normally open electromagnetic valve $V_{ORR}$, the entry passage 113 being opened to the insertion hole 111 at the same position as the opening position of the entry passage 110 along the axial direction of the insertion hole 111.

An input connecting hole $112_1$ serving as a threaded hole is provided in the surface of the base 34 coaxially with the insertion hole 111. The flare portion 108 is provided at an end of the input conduit $39_1$ coupling to the output port $13a$ of the master cylinder M. The input conduit $39_1$ fits the screw member 109 screwed into the input connecting hole $112_1$.

The insertion hole 111 is formed with a stepped portion so that the insertion hole 111 has a large-diameter portion $111a$ at an end thereof on the side of the input connecting hole $112_1$ and a small-diameter portion $111b$ at another end on the side of the return pump $21_1$. A pipe member 114 is inserted into the insertion hole 111.

The pipe member 114 is so formed that a sheet pipe 115 light-forcibly fitted into the large-diameter portion $111a$ of the insertion hole 111 and the orifice $25_1$ light-forcibly fitted into the small-diameter portion $111b$ are coaxially coupled to each other via a coupling pipe 116 integrally. An annular passage 117 is thus formed between the intermediate inner surface between the large-diameter portion $111a$ and the small-diameter portion $111b$ in the insertion hole 111, and the outer surface of the coupling pipe 116. The entry passages 110, 113 are opened in the intermediate inner surface of the insertion hole 111 so as to communicate to the annular passage 117. Moreover, a plurality of communicating holes 118 for communicating the pipe member 114 with the annular passage 117 are provided in the side wall of the coupling pipe 116.

The entry passages 110, 113 coupling to the normally open electromagnetic valves $V_{OFL}$, $V_{ORR}$ are communicated with the output port $13a$ of the master cylinder M by the screw member 109 screwed into the input connecting hole $112_1$ to press the flare portion 108 of the input conduit $39_1$ against the sheet pipe 115.

The input conduit $39_2$ coupling to the output port $13b$ of the master cylinder M is connected to the input connecting hole $112_2$ of the base 34 with the same arrangement as that of the input conduit $39_1$. The normally open electromagnetic valves $V_{OFL}$, $V_{ORR}$ are connected to not only the input conduit $39_2$ but also the annular discharge passage of the return pump $21_2$ via the orifice $25_2$, being similar to the normally open electromagnetic valves $V_{OFR}$, $V_{ORL}$.

The operation of the first embodiment of the present invention will subsequently be described. The coil 48 in each of the normally open electromagnetic valves $V_{OFL}$, $V_{ORR}$, $V_{OFR}$, $V_{ORL}$ is excited to generate magnetic flux from the fixed core $43_O$ up to the fixed core $43_O$ via the press plate 52, the yoke 49, the guide tube 41 and the movable core $44_O$. When the movable core $44_O$ is attracted to the fixed core $43_O$, the valve member 46 is seated in the valve seat 45 to close the valve hole 57. Moreover, the coil 48 in each of the normally closed electromagnetic valves $V_{CFL}$, $V_{CRR}$, $V_{CFR}$, $V_{CRL}$ is excited to generate magnetic flux from the fixed core $43_C$ up to the fixed core $43_C$ via the guide tube 41, the yoke 49, and the movable core $44_C$. When the movable core $44_C$ is attracted to the fixed core $43_C$, the valve member 46 is separated from the valve seat 45 to open the valve hole 57.

In the anti-lock brake control apparatus 15 as described above, the insertion holes 111 are formed in the base 34 for serving as threaded holes to connect the conduits $39_1$, $39_2$ coupling to the output ports 13a, 13b of the master cylinder M. The insertion holes 111 are formed coaxial with the input connecting holes $112_1$, $112_2$. Moreover, the insertion holes 111 have the large-diameter portions 111a on the side of the input connecting holes $112_1$, $112_2$ and the small-diameter portions 111b on the sides of the return pumps $21_1$, $21_2$ at both the respective ends. The insertion holes 111 insert the pipe members 114 integrally formed by combining the sheet pipes 115 light-forcibly fitted into the large-diameter portions 111a and the orifices $25_1$, $25_2$ light-forcibly fitted into the small-diameter portions 111b via the coupling pipes 116 coaxially. Accordingly, since the sheet pipes 115 and the orifices $25_1$, $25_2$ are integrated respectively, the number of component parts can be reduced. Further, since the sheet pipes 115 and the orifices $25_1$, $25_2$ are light-forcibly fitted into the base 34, the possibility of producing the dust can be reduced, so that the normally open electromagnetic valves $V_{OFL}$, $V_{ORR}$, $V_{OFR}$, $V_{ORL}$ are consequently prevented from malfunctioning because of the dust. Moreover, since the orifices $25_1$, $25_2$ are each integrated with the sheet pipes 115 which are restrained from separating outwardly by the screw members 109 screwed into the input connecting holes $112_1$, $112_2$, the orifices $25_1$, $25_2$ are prevented from deviating due to the discharge pressure produced from the return pumps $21_1$, $21_2$.

According to the anti-lock brake control apparatus 15, the annular passage 117 coupling to the entry passages 110, 113 is formed between the intermediate inner surface of the insertion hole 111 and the outer surface of the coupling pipe 116, and the plurality of communicating holes 118 coupling to the annular passage 117 are formed in the side wall of the coupling pipe 116. Therefore, the sheet pipe 115 and the orifices $25_1$, $25_2$ can surely be communicated with the entry passages 110, 113 without giving attention specifically to the relative position in the circumferential direction between the pipe member 114 and the insertion hole 111.

Further, the coil assemblies 68 in the normally open electromagnetic valves $V_{OFL}$, $V_{ORR}$, $V_{OFR}$, $V_{ORL}$ and the normally closed electromagnetic valves $V_{CFL}$, $V_{CRR}$, $V_{CFR}$, $V_{CRL}$ are held between the press plate 52 securely fastened to the base 34 and the cover 38 securely fastened to the press plate 52 in such a state that the yokes 49 are fitted to the coil assemblies 68, respectively. Therefore, the coil assemblies 68 can be mounted on the base 34 at a time to ease the assembling work when compared to separately mounting the coil assemblies 68. Particularly, the pair of recesses 75, 75 are formed in circular shapes with the center points corresponding to the central positions around which the first group of the normally open electromagnetic valves $V_{OFL}$, $V_{ORR}$ and the normally closed electromagnetic valves $V_{CFL}$, $V_{CRR}$, and the second group of the normally open electromagnetic valves $V_{OFR}$, $V_{ORL}$ and the normally closed electromagnetic valves $V_{CFR}$, $V_{CRL}$ are located, respectively. The fastening force acts on the central portions of the recesses 75, 75 by the clamping screws 80, 80. Therefore, the coil assemblies 68 can surely be held between the closing plate portion 38b of the cover 38 and the press plate 52 because of resiliency resulting from the presence of the recesses 75, 75.

Moreover, the discharge passage 102 for communicating the annular discharge passage 121 around the pumps $21_1$, $21_2$ with the damper chamber 86 of the damper $24_1$ is formed in the base 34 so that the discharge passage 102 directly communicates with a portion of the annular discharge passage 121 on the side of the motor 22. Accordingly, since the discharge passage 102 communicates with the damper chamber 86 and with the master cylinder M via the orifices $25_1$, $25_2$, there exists no annular discharge passage 121 having high flow passage resistance between the damper chamber 86 and the orifices $25_1$, $25_2$. Therefore, the damper chamber 86 and the orifices $25_1$, $25_2$ cooperate together to exert an effective attenuating action so as to attenuate the pressure pulsation effectively transmitted from the annular discharge passage 121. As a result, the transfer of vibration to the master cylinder M can be suppressed.

Figure 11:
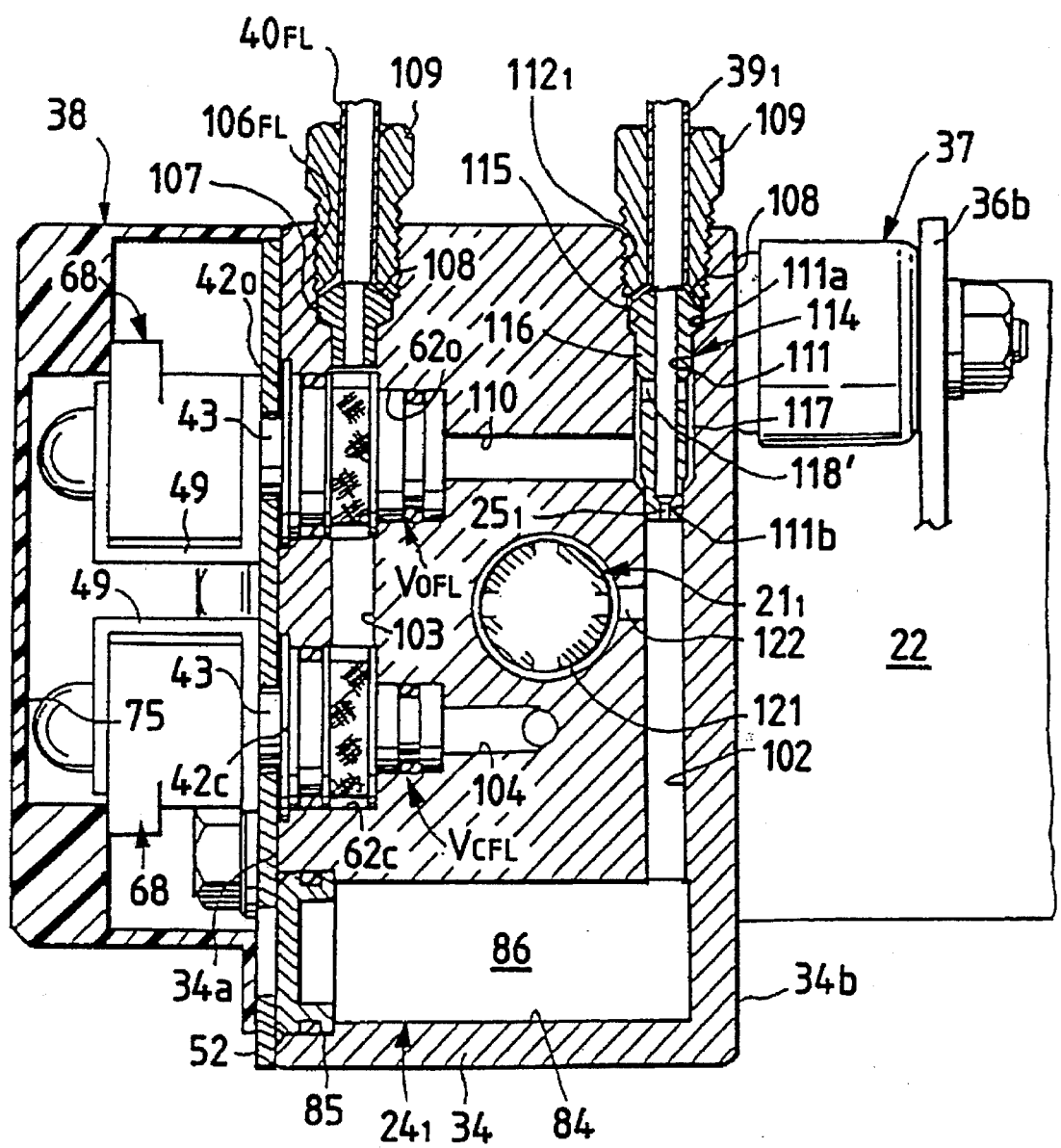
FIG. 11 is an enlarged vertical sectional view of the principal part in a second embodiment the present invention.

FIG. 11 illustrates a second embodiment of the present invention, in which like reference characters designate like components in the first embodiment thereof.

The base 34 includes a communicating passage 122 slightly extending toward the motor 22 for communicating the annular discharge passage 121 of the pumps $21_1$, $21_2$ with an end on the side of the motor 22. The discharge passage 102 connecting the damper chamber 86 of the dampers $24_1$, $24_2$ vertically extends for communicating with another end of the communicating passage 122.

In the pipe member 114 integrated with the sheet pipe 115 and the orifice $25_1$ coaxially via the coupling pipe 116, a plurality of communicating holes 118' for communicating within the pipe member 114 are formed at the end of the coupling pipe 116 and at the upper end of the annular passage 117 formed between the outer surface of the coupling pipe 116 and the intermediate inner surface coupling between the large-diameter portion 111a and the small diameter portion 111b of the insertion hole 111.

According to the second embodiment of the present invention, the discharge passage 102 is communicated indirectly with the annular discharge passage 121 in the pump $21_1$ via the communicating passage 122 coupling to a circumferential portion of the annular discharge passage 121. As in the case of the first embodiment of the present invention, the damper chamber 86 and the orifices $25_1$, $25_2$ cooperate together to exert an effective attenuating action so as to attenuate the pressure pulsation effectively. The transfer of vibration to the master cylinder M can thus be suppressed. In addition, an air pool can be prevented from forming within the annular passage 117. Therefore, the normally open electromagnetic valves $V_{OFL}$–$V_{ORL}$ can be prevented from malfunctioning due to air accompanying the hydraulic fluid flowing toward the normally open electromagnetic valves $V_{OFL}$–$V_{ORL}$.

Although a detailed description has been given of the embodiments of the present invention, the invention is not limited to those embodiments thereof but may be altered in design without departing from the spirit of the invention. For example, the damper chamber 86 can be allowed to communicate with the discharge passage 102 between the annular discharge passage 121 and the orifices $25_1$, $25_2$. Further, the present invention is applicable to an anti-lock brake control apparatus in which the dampers $24_1$, $24_2$ connected to the return pumps $21_1$, $21_2$ are arranged between the orifices $25_1$, $25_2$ and the return pumps $21_1$, $21_2$.

As described above, in the first aspect of the present invention, the base is provided with the discharge passage coupling to a circumferential portion of the annular discharge passage and also to the damper chamber. Since the hydraulic equipment is connected via the orifice to the discharge passage, the annular discharge passage is unnecessary to arrange between the damper chamber and the orifices, so that the damper chamber and the orifices cooperate together to exert an effective attenuating action thereon so as to suppress the transfer of pressure pulsation thereto effectively.

In the second aspect of the present invention, the discharge passage is connected via the orifices to the master cylinder serving as hydraulic equipment and connected via the normally open electromagnetic valves to the wheel brakes between the orifices and the master cylinder, and the normally closed electromagnetic valves are each provided between the reservoirs with the suction vents of the pumps connected thereto and the wheel brakes, so that by effectively applying the present invention to a reflux anti-lock brake control apparatus, the transfer of discharge vibration transmitting from the pumps to the master cylinder can effectively be prevented.

In the third aspect of the present invention, the base is provided with the insertion hole with both the ends having the large-diameter portion on the side of the connecting hole and the small-diameter portion on the side of the return pump or damper side, the insertion hole being coaxial with the connecting hole, in which the sheet pipe fitted into the large-diameter portion and the orifice fitted into the small-diameter portion are coaxially and integrally coupled via the coupling pipe portion, and the communicating holes each coupled to the entry sides of normally open electromagnetic valves are bored in the side wall of the coupling pipe portion for communicating the inside of the communicating holes with the entry passage of the base. Consequently, the combination of the orifices and the sheet pipe makes it possible to reduce the number of component parts and prevents the normally open electromagnetic valves from malfunctioning by restraining the generation of cutting dusts resulting from lightly forcing the orifices and the sheet pipe into the base and further the orifices from deviating the correct position due to the discharge pressure of the return pumps.

In the fourth aspect of the present invention, the insertion hole has the intermediate stepped portion whose diameter is smaller than that of the large-diameter portion and greater than that of the small-diameter portion and the annular passage communicating with the communicating holes is formed between the outer surface of the coupling pipe portion and the inner surface of the intermediate portion of the insertion hole, the entry passage communicating with the annular passage being provided in the base to ensure that the sheet pipe and the orifices are communicated with the entry passages coupled to the normally open electromagnetic valves without giving attention specifically to the circumferential relative position of the sheet pipe and the orifices in combination and the insertion hole.

What is claimed is:

1. A hydraulic apparatus comprising:

a base including a base discharge passage;

a pump positioned within the base, the pump having an annular discharge passage;

a damper including a damper chamber connected to the base discharge passage; and a hydraulic device connected to the base discharge passage via an orifice, wherein the base discharge passage is connected to a circumferential portion of the annular discharge passage to allow the pump to communicate with the damper chamber, said base discharge passage comprising a direct connection between said orifice and said damper chamber.

2. The hydraulic apparatus of claim 1, wherein said pump includes a suction chamber, said hydraulic apparatus further comprising:

a reservoir connected to said suction chamber of the pump;

a first electromagnetic valve coupled between the orifice and the hydraulic device;

a second electromagnetic valve connecting the first electromagnetic valve and the reservoir; and a braking device coupled between the normally open electromagnetic valve and the normally closed electromagnetic valve.

3. The hydraulic apparatus of claim 2, wherein the pump includes a suction valve for controllably connecting the reservoir with the suction chamber and a discharge valve for controllably connecting the pump to the damper chamber.

4. The hydraulic apparatus of claim 2, wherein each of the first and second electromagnetic valves comprises:

a main housing body including a valve seat and a cylindrical guide tube with a closed end;

a fixed core connected to an end of the guide tube;

a movable core positioned in the guide tube;

means for urging said movable core in a direction away from the fixed core;

a valve member secured to the movable core and positionable in the valve seat;

a coil assembly including a bobbin surrounding the guide tube and a coil wound on the bobbin; and a yoke partially covering the coil assembly.

5. The hydraulic apparatus of claim 4, further comprising a cover connected to said base, wherein said cover includes recesses for holding each of said yoke of said first electromagnetic valve and said second valve against respective ones of said coil assembly of said first electromagnetic valve and said second valve.

6. The hydraulic apparatus of claim 2, further comprising a cover connected to said base, wherein said cover holds said first electromagnetic valve and said second valve in position within said base.

7. The hydraulic apparatus of claim 6, wherein said cover includes recesses for holding said first electromagnetic valve and said second valve.

8. The hydraulic apparatus of claim 2, wherein said first electromagnetic valve is normally open and said second electromagnetic valve is normally closed.

9. The hydraulic apparatus of claim 1, wherein the base includes a fitting hole extending along a first direction, the fitting hole for securing the pump to the base, and wherein the pump includes:

a pump housing positioned in the fitting hole;

a piston slidably positionable within the pump housing;

a pump chamber formed between the pump housing and the piston; and an annular suction passage positioned at a first end of said pump between an inner surface of the fitting hole and an outer surface of the pump housing, the annular discharge passage being positioned at a second end of said pump between the inner surface of the fitting hole and the outer surface of the pump housing.

10. The hydraulic apparatus of claim 9, wherein the piston includes:

a suction chamber connected to the annular suction passage; and a suction valve for connecting the suction chamber with the pump chamber, wherein when said suction valve opens a capacity of the pump chamber increases.

11. The hydraulic apparatus of claim 9, wherein the pump housing includes:

a discharge chamber connected to the annular discharge passage; and a discharge valve for connecting the base discharge chamber with the pump chamber, wherein when said discharge valve opens a capacity of the pump chamber decreases.

12. The hydraulic apparatus of claim 9, further comprising a reservoir including a reserve chamber connected to a suction chamber of the pump, wherein the base includes a suction passage for connecting the annular suction passage with the reserve chamber of the reservoir.

13. The hydraulic apparatus of claim 9, wherein the base discharge passage extends linearly in the base and includes:

a first end operatively connected to the hydraulic device via the orifice; and a second end connected to the damper chamber, the discharge passage connecting the annular discharge passage to said hydraulic device and said damper chamber.

14. The hydraulic apparatus of claim 1, wherein the hydraulic device comprises a master cylinder.

15. The hydraulic apparatus of claim 1, wherein the base discharge passage extends linearly in the base and includes:

a first end operatively connected to the hydraulic device via the orifice; and a second end connected to the damper chamber, the base discharge passage connecting the annular discharge passage to said hydraulic device and said damper chamber.

16. The hydraulic apparatus of claim 1, further comprising a communication passage for connecting said base discharge passage with said annular discharge passage.

17. The hydraulic apparatus of claim 1, wherein said base discharge passage is connected to a predetermined area of said circumferential portion of said annular discharge passage such that said annular discharge passage does not completely overlap said base discharge passage.

18. The hydraulic apparatus of claim 1, wherein said circumferential portion of said annular discharge passage enters only a first side of said base discharge passage and exits only said first side of said base discharge passage.

* * * * *